US008834818B2

(12) United States Patent
Ferron (10) Patent No.: US 8,834,818 B2
(45) Date of Patent: Sep. 16, 2014

(54) TREATMENT OF INDIUM GALLIUM ALLOYS AND RECOVERY OF INDIUM AND GALLIUM (75) Inventor: Casare G. Ferron, Peterborough (CA)

(73) Assignee: Molycorp Minerals Canada ULC (CA)

( * ) Notice: Subject to any disclaimer, the term of this patent is extended or adjusted under 35 U.S.C. 154(b) by 0 days.

(21) Appl. No.: 13/989,740

(22) PCT Filed: Nov. 22, 2011

(86) PCT No.: PCT/CA2011/001276
§ 371 (c)(1),
(2), (4) Date: Jul. 24, 2013

(87) PCT Pub. No.: WO2012/068668
PCT Pub. Date: May 31, 2012

(65) Prior Publication Data
US 2014/0065037 A1 Mar. 6, 2014

(30) Foreign Application Priority Data

Nov. 26, 2010 (CA) ..................... 2721518

(51) Int. Cl.
C22B 58/00 (2006.01)
C22B 3/04 (2006.01)
C22B 3/26 (2006.01)
C22B 3/08 (2006.01)
C22B 15/00 (2006.01)
C22B 7/00 (2006.01)

(52) U.S. Cl.
CPC ... *C22B 3/04* (2013.01); *C22B 7/00* (2013.01); *C22B 7/006* (2013.01); *C22B 3/0005* (2013.01); *C22B 3/08* (2013.01); *C22B 7/007* (2013.01); *C22B 15/0089* (2013.01); *C22B 58/00* (2013.01)

USPC ............ 423/112; 423/111; 423/131; 423/132

(58) Field of Classification Search
CPC .................................. C22B 58/00; C22B 7/00
USPC .................................. 423/112, 111, 131, 132
See application file for complete search history.

(56) References Cited

U.S. PATENT DOCUMENTS 6,319,483 B1 11/2001 Kudo et al.
2010/0226839 A1 9/2010 Lian et al.

FOREIGN PATENT DOCUMENTS

CA 2632923 7/2007

OTHER PUBLICATIONS

Guarde, "Sustainability Evaluation of Solar Energy Systems," *Gaiker ik 4 Research Alliance—21st European Photovoltaic Solar Energy Conference* (Dresden), (Sep. 7, 2006).
Held et al., "SENSE—Recycling of Production Waste," accessed on the Internet at: www.sense-eu.net/30.html (published Nov. 21, 2007).

(Continued)

*Primary Examiner* — Melissa Stalder
(74) *Attorney, Agent, or Firm* — Barnes & Thornburg LLP (57) ABSTRACT There is provided a hydrometallurgical process of recovering indium and gallium values from mixtures thereof with other metal values for example recycled and scrap solar panel cells which comprises subjecting the mixture to strongly oxidizing acid conditions, preferably via the simultaneous addition of sulfuric acid and hydrogen peroxide to the leach vessel, so as to form indium and gallium salt species of at least the major proportion of the indium and gallium values in the mixture, extracting the indium and gallium values with an organic extractant by adjusting the pH so as to extract individually the indium and gallium values with the organic extractant, stripping indium and gallium values from the extractant using an acid and an alkaline solution respectively and recovering the indium and gallium values.

12 Claims, 7 Drawing Sheets (56) References Cited

OTHER PUBLICATIONS

Lee et al., "Solvent Extraction Separation of Indium and Gallium from Sulphate Solutions Using D2EHPA," *Hydrometallurgy*; 63: 269-276 (2002).

Nishihama et al., "Separation and Recovery of Gallium and Indium from Simulated Zince Refinery Residue by Liquid-Liquid," *Ind. Chem. Res.* 38(3): 1032-1039 (1999).

Solvent Extraction—Principles and Applications to Process Metallurgy, vol. 2, Chapter 3, Section 3.8, *G.M. Ritcey & Associates*: Ottawa, Canada, Revised $2^{nd}$ Edition, pp. 239-245 (2006).

Wikipedia "Selenium" downloaded from Wikipedia Aug. 18, 2011 (http://en.wikipedia.org/wiki/Selenium).

Zhou et al., "Recovering In, Ge and Ga from Zinc Residues," *Journal of the Minerals, Metals and Materials Society*, 36-40 (1989).

Search Report and Written Opinion issued in App. No. PCT/CA2011/001276 (2012).

Table 1: Chemical Analysis of Exemplary Indium-Gallium Containing Scrap Material

| Material | % Cu | % In | % Ga | % Se |
|---|---|---|---|---|
| CIG | 30.0 | 60.0 | 10 | - |
| CIGS | 12.6 | 22.3 | 7.1 | 57.5 |
| IGS | - | 39 | 16 | 45.0 |

Table 2: Exemplary Indium, Gallium, Copper and Selenium Recovery from Oxidizing Scrap Material Leaches

| | Leach Conditions | | | | | | | % Leach Extraction | | | |
|---|---|---|---|---|---|---|---|---|---|---|---|
| Type of Feed | Fine Powder | Temperature (°C) | Time (hrs) | Acid | Oxidant | % Solids | | Indium | Gallium | Copper | Selenium |
| CIGS | Yes | 50 | 2 | $H_2SO_4$ | $HNO_3$ | 10 | | >99.5 | >99.5 | >99.5 | >99.5 |
| CIGS | Yes | 50 | 5 | $H_2SO_4$ | $H_2O_2$ | 10 | | >99.5 | >99.5 | >99.5 | >99.5 |
| CIG | Yes | 50 | 5 | $H_2SO_4$ | $H_2O_2$ | 10 | | >96.0 | >96.0 | >96.0 | >96.0 |
| CIG | No | 50 | 144 | $H_2SO_4$ | $H_2O_2$ | 10 | | >99.5 | >99.5 | >99.5 | >99.5 |
| IGS | Yes | 80 | 5 | $H_2SO_4$ | $H_2O_2$ | 10 | | >93.0 | 97.8 | N/A | 94.5 |
| Ox-CIGS* | Yes | 80 | 5 | $H_2SO_4$ | $H_2O_2$ | 5 | | >99.5 | >98.5 | >99.5 | >99.5** |

* CIGS obtained after removing 95% of the Selenium by oxidative calcination at 950°C.
** Extraction based on the residual Selenium after calcination.

FIG. 5

Table 3: Exemplary Aqueous Phase Extractant/Organic Recovery of Indium and Gallium from the Leaching Solution

| Sample | g/L in Aqueous Phase | | |
|---|---|---|---|
| | Indium | Gallium | Copper |
| Starting Aqueous Solution | 14.9 | 2.29 | 3.39 |
| Aqueous Solution after 1st Contact | 0.56 | 2.31 | 3.45 |
| Aqueous Solution after 2nd Contact | 0.0001 | 2.22 | 3.38 |

FIG. 6

Table 4: Exemplary Aqueous Phase Indium-Devoid Separation Gallium Extraction

| Aqueous Phase pH for Extraction | % Extracted by organic phase | |
|---|---|---|
| | Gallium | Copper |
| 0.5 | 0 | 0 |
| 1.0 | 0 | 0 |
| 1.5 | 50 | 0 |
| 2.0 | 82.5 | 6 |
| 2.5 | 100 | 21 |

FIG. 7

Table 5: Exemplary Aqueous Phase Extractant/Organic Recovery of Indium and Gallium from the Leaching Solution

| Sample | g/L in Aqueous Phase | | | |
|---|---|---|---|---|
| | Indium | Gallium | Copper | Selenium |
| Starting Aqueous Solution | 8.78 | 2.85 | 5.86 | 23.5 |
| Aqueous Solution after 1st Contact (pH=1.0) | 0.049 | 1.96 | 5.93 | 22.9 |
| Aqueous Solution after 2nd Contact (pH=1.7) | Not Detected | Not Detected | 4.39 | 19.0 |

TREATMENT OF INDIUM GALLIUM ALLOYS AND RECOVERY OF INDIUM AND GALLIUM

RELATED APPLICATION

The present application is a U.S. nationalization under 35 U.S.C. §371 of International Application No. PCT/CA2011/001276, filed Nov. 22, 2011, which claims benefit of priority to Canadian Patent Application No. 2,721,518, filed Nov. 26, 2010, entitled "TREATMENT OF INDIUM GALLIUM ALLOYS AND RECOVERY OF INDIUM AND GALLIUM." The disclosures set forth in the referenced patent applications are incorporated herein by reference in their entireties.

FIELD OF THE DISCLOSURE

The present disclosure relates to indium and gallium and indium and gallium compounds. More specifically, it relates to processes for extracting indium and gallium and compounds thereof from compositions containing indium and gallium compounds along with other metals and metal compounds, for example alloys, ores and metallurgical residues containing copper and selenium.

BACKGROUND OF THE DISCLOSURE

Indium (In) is a rare, soft and malleable post-transition metal which is chemically similar to gallium (Ga) and has an atomic number of 49 and an atomic weight of 114.8. It has a low melting point (156.6° C.); a property which makes it useful in various low melting point applications, such as being a component in low melting point lead-free solders. In appearance, indium is a silvery-white true metal with a bright luster and emits a high-pitched "cry" when bent. Furthermore, it has a standard electrode potential of +0.34V and three oxidation states (+3, +2, and +1), the most common being +3. In nature indium is usually found in solid solution of some zinc sulphide (sphalerite) minerals.

Indium is commonly used to form transparent electrodes from indium tin oxide in liquid displays and touchscreens. It is also used in thin-films to form lubricated layers, for example, in high-performance bearing applications. In a radioactive form Indium-111 is used in leukocyte imaging for tracking leukocytes movement in living organisms.

Gallium (Ga), as noted above, is similar in characteristics to indium, being a group 13 post-transitional metal. Gallium has an atomic number of 31 and an atomic weight of 69.7. Furthermore, gallium has an extremely low melting point of 29.7° C. and has a brilliant silvery colour. Gallium has three oxidation states (+3, +2, and +1), the most common of which being +3. The electrode potential of gallium is +0.56V. Interestingly, it does not exist in free form in nature and is often found as a trace metal in bauxite, some sphalerite and compounded with copper in gallite ($CuGaS_2$).

Gallium is commonly used as part of the compound gallium arsenide in microwave circuitry and infrared applications as a well as gallium nitride, and gallium indium nitride in semiconductor applications. It is also used in blue and violet light-emitting diodes and diode lasers.

With its various uses and owing to supply and demand concerns, recently the world price of indium has increased, in some instances by 7 to 10 times in the past 5 years. Also, the cost of gallium and the fact that it does not exist in a free form in nature cause it to have a relatively high price of about $220/100 g. As a result, recovery of the indium and gallium content from various sources is desirable.

One such source from which indium and gallium can be obtained is from recycling or waste material from the construction of copper-indium-gallium (CIG), copper-indium-gallium-selenium (CIGS), gallium-indium-zinc oxide (GIZO) and indium-gallium-selenium (IGS) solar panel cells. During the manufacturing process of the CIG, CIGS, GIZO and IGS solar panels, scraps and waste material are generated which contain indium and gallium in large quantities. Also, other metals, such as selenium, which may be harmful to the environment if not disposed of properly, or which may also be desirable to recover, may be found in this scrap or recyclable material.

With a current shift in many regions of the world to alternative energy sources used or worn-out solar panels such as those described above will become an increasing problem. Also, scrap material from the manufacturing process of new solar panels can be recycled and thus diverted from waste facilities. Therefore, it would be advantageous and desirable to develop a method for recovering indium and gallium, as well as other metals from waste material from solar panel production and from the recycling of used solar panels.

BRIEF REFERENCE TO THE PRIOR ART

Primary gallium is mostly produced by treating Bayer liquors, which are produced by dissolving bauxite in caustic soda, in aluminum bauxite production plants so as to recover gallium values. In such plants, where the content of gallium in the bauxite is high enough to warrant its recovery, gallium values can be recovered from alkaline solutions containing gallium by various methods, including ion exchange and solvent extraction. A process for the recovery of gallium values from aluminum bauxite production is purported to be disclosed in: *Solvent Extraction—Principles and Applications to Process Metallurgy*, Volume 2, Gordon M. Ritcey, Chapter 3, Section 3.8, G. M. Ritcey & Associates: Ottawa, Canada, Revised 2nd Edition, 2006 referencing Ritcey et al. "Recovery of Gallium from Bayer Liquor" by in Ritcey et al., presented at the AIChE meeting, New York, 1983

Indium and gallium are very rarely associated in nature in quantities such that their recovery from the same source is feasible. Indium is mostly produced as a by-product in zinc smelting reactions and on occasion as a by-product of copper smelting reactions. Furthermore, gallium may also, on occasion be recovered as by-product from zinc smelters.

In some zinc smelting processes, jarosite, having the chemical formula of $M—Fe_3(SO_4)_2(OH)_6$, where "M" is a monovalent cation is formed and precipitated via the leaching of indium- and gallium-containing minerals from, for example sphalerite. The leaching solution is processed such that indium and gallium are precipitated with the jarosite and recovered. In such processes, a by-product containing both indium and gallium is generated, however such a product would generally contain less than 0.5% indium and less than 0.5% gallium. U.S. Pat. No. 6,319,483, entitled "Gallium and/or Indium Separation and Concentration Method", issued Nov. 20, 2001 to Kudo et al., purports to describe a process for treating a product as noted above for the recovery of indium and gallium values. Briefly, such a process comprises a succession of a complex series of leaching, precipitation, purification and neutralization steps which may be prone to cross-contamination and not suitable for a commercial scale.

Zhou et al., in their 1989 paper published in the Journal of the Minerals, Metals and Materials Society, entitled "Recovering In, Ge and Ga from Zinc Residues," (June 1989, pp. 36-40) describe another process for the separation and recovery of indium and gallium values from a low grade indium and gallium containing by-product of zinc smelting. The by-product from which the indium and gallium values are recovered comprises about 0.5% to about 1.0% for both indium and gallium. Again, the process described is fairly complex and involves the use of two different solvent extraction circuits with two different organic phases. The first organic phase in this process is composed of a DEPHA (diethylhexylphosphoric acid) solution with an accelerator and a kerosene-type diluent so as to extract indium and iron and a second organic phase using a substituted hydroxamic acid with a stability modifier in a diluent to extract germanium and gallium. There exists a significant risk of cross-contamination with both circuits and a significant risk of chemical instability in the second organic circuit described above when using a non-commercially proven organic phase (the substituted hydroxamic acid and stability modifier). These risks may render the process unsuitable for plant usage at a commercial scale.

In the 2002 paper by Lee et al. entitled "Solvent Extraction Separation of Indium and Gallium from Sulphate Solutions Using D2EHPA" published in Hydrometallurgy (Vol. 63, pp. 269-276), a process for the extraction of indium and gallium in sulfuric acid solutions is described. Lee et al. purport to describe a process, at an experimental level, for the extraction of indium and gallium metals from prepared or synthetic indium and gallium-containing sulfate solutions which do not contain other metal values wherein the indium and gallium starting values are 99.9% pure. These synthetic indium- and gallium-containing sulfuric acid solutions contained, for the majority of the results published, only a combined concentration of 1.5 g/L indium plus gallium, with no mention of any other metal values being present. Furthermore, the indium and gallium values were not first leached from a material containing a mixture of other metal values, and the D2EPHA concentration in the organic phase disclosed was typically 0.025 to 0.050M in kerosene or benzene. Moreover, the sharpness of the separation factor of indium from gallium decreased sharply from the concentrations of 0.05M to 0.1M in the conditions used by Lee et al. In the experiments of Lee et al., the indium- and gallium-containing sulfuric acid solutions were contacted for a time of 30 minutes, therefore making the process impractical for industrial applications.

Therefore, it would be desirable to develop a process for extracting indium and gallium values from a starting material, which has a reduced risk of cross-contamination and employs a single organic stage extraction process using commercially-available reagents. Furthermore, it would be desirable to develop a process which uses chemically stable and inexpensive reagents. Additionally, it would be desirable to utilize reagents in such a process which have a high loading capacity for indium and gallium so as to allow for the processing of a feed material which contains, for example, about 20% to 50% indium and gallium.

BRIEF DESCRIPTION OF THE FIGURES

Several exemplary embodiments of the present invention will be provided, by way of examples only, with reference to the appended figures, wherein.

SUMMARY OF THE DISCLOSURE

The following presents a simplified summary of the general inventive concept herein to provide a basic understanding of some aspects of the disclosure. This summary is not an extensive overview of the disclosure. It is not intended to restrict key or critical elements of the disclosure or to delineate the scope of the disclosure beyond that explicitly or implicitly described by the following description and claims.

The present disclosure provides a hydrometallurgical process of recovering indium and gallium values from materials with other metal values. The process comprises:
a) reducing the size of the indium- and gallium-containing materials so as to form a finely-divided mixture including indium and gallium values with other metals;
b) subjecting the mixture to strongly oxidizing aqueous acid conditions having the capacity to substantially avoid the generation of hydrogen gas, so as to form indium salt and gallium salt species in an aqueous leaching solution of at least a major proportion of the indium and gallium values in the mixture;
c) filtering the aqueous leaching solution so as to substantially remove leach residues and adjusting the pH of the leach solution;
d) subjecting the indium and gallium salt species in the aqueous leaching solution to a first volume of an organic extractant so as to selectively form an indium-organic in an organic phase;
e) separating and recovering at least a major portion of the indium-organic resultant from (d) from the gallium salt species in the aqueous leaching solution;
f) adjusting the pH of the aqueous leaching solution resultant from (e);
g) subjecting the gallium salt species in the aqueous leaching solution to a second volume of the organic extractant so as to selectively form a gallium-organic in the organic phase;
h) separating the gallium-organic resultant from (g) so as to recover at least a major portion of the gallium-organic;
i) stripping the recovered indium-organic with an acid so as to yield a substantially pure indium salt and a first stripped organic extractant; and
j) stripping the recovered gallium-organic with a base so as to yield a substantially pure gallium salt and a second stripped organic extractant.

In another exemplary embodiment there is provided a hydrometallurgical process of recovering indium and gallium values from indium- and gallium-containing starting materials with other metal values, the process comprising:
a) providing an oxidizing acid leach solution;
b) combining the indium- and gallium-containing starting material including other metal values and the oxidizing acid leach solution so as to form a combined solution;
c) oxidizing and solubilizing the indium and gallium values in the combined solution;

d) adjusting the pH;
e) adding a first volume of an organic extractant to the combined solution so as to form indium-loaded organic compounds;
f) separating the indium-organic phase from the combined solution so as to yield a substantially indium-devoid solution;
g) adjusting the pH of the indium-devoid solution and adding a second volume of the organic extractant to the indium-devoid solution so as to form a gallium-loaded organic;
h) separating the gallium-loaded organic from the indium-devoid solution;
i) stripping the indium-loaded organic compound with an acid so as to recover substantially pure indium salt and yield a first stripped organic extractant; and
j) stripping the gallium-loaded organic compound with a base so as to recover substantially pure gallium salt and yield a second stripped organic extractant.

In yet another exemplary embodiment, there is provided a hydrometallurgical process of recovering indium and gallium values from materials with other metal values, the process comprising the steps of:
a) reducing the size of the indium- and gallium-containing materials so as to form a finely-divided mixture including indium and gallium values with other metals;
b) subjecting the mixture to strongly oxidizing aqueous acid conditions having the capacity to substantially avoid the generation of hydrogen gas, so as to form indium salt and gallium salt species in an aqueous leaching solution of at least a major proportion of the indium and gallium values in the mixture;
c) filtering the aqueous leaching solution so as to substantially remove leach residues and adjusting the pH of the leach solution so as to be from about 0.5 to about 1.0;
d) subjecting the indium and gallium salt species in the aqueous leaching solution to a first volume of an organic extractant so as to selectively form an indium-organic in an organic phase;
e) separating and recovering at least a major portion of the indium-organic resultant from (d) from the gallium salt species in the aqueous leaching solution;
f) adjusting the pH of the aqueous leaching solution resultant from (e) so as to be from about 1.5 to about 2.5;
g) subjecting the gallium salt species in the aqueous leaching solution to a second volume of the organic extractant so as to selectively form a gallium-organic in the organic phase;
h) separating the gallium-organic resultant from (g) so as to recover at least a major portion of the gallium-organic;
i) stripping the recovered indium-organic with an acid so as to yield a substantially pure indium salt and a first stripped organic extractant; and
j) stripping the recovered gallium-organic with a base so as to yield a substantially pure gallium salt and a second stripped organic extractant.

In still yet another exemplary embodiment, there is provided a hydrometallurgical process of recovering indium and gallium values from indium- and gallium-containing starting materials with other metal values, the process comprising the steps of:
a) providing an oxidizing acid leach solution;
b) combining the indium- and gallium-containing starting material including other metal values and the oxidizing acid leach solution so as to form a combined solution;
c) oxidizing and solubilizing the indium and gallium values in the combined solution;
d) adjusting the pH of the combined solution so as to be from about 0.5 to about 1.0;
e) adding a first volume of an organic extractant to the combined solution so as to form indium-loaded organic compounds;
f) separating the indium-organic phase from the combined solution so as to yield a substantially indium-devoid solution;
g) adjusting the pH of the indium-devoid solution so as to be from about 1.5 to about 2.5 and adding a second volume of the organic extractant to the indium-devoid solution so as to form a gallium-loaded organic;
h) separating the gallium-loaded organic from the indium-devoid solution;
i) stripping the indium-loaded organic compound with an acid so as to recover substantially pure indium salt and yield a first stripped organic extractant; and
j) stripping the gallium-loaded organic compound with a base so as to recover substantially pure gallium salt and yield a second stripped organic extractant.

DETAILED DESCRIPTION

It is known that indium can be extracted from acid solutions under the proper conditions using an appropriate extractant at the appropriate pH value range. Similarly, it is also know that gallium can be extracted from acid solutions using an appropriate extractant at the appropriate pH value range. Disclosed herein is a process for selectively extracting indium from gallium in acidic solutions when both metals are present and derived from a starting material containing other metal values. In some exemplary embodiments, quantities of copper, selenium and zinc may also be present. A particular advantage of preferred embodiments of the invention is that only one organic phase is used, thereby avoiding risks cross-contamination of organic solutions present in some prior art processes, such as that in Zhou et al., discussed above.

Figure 1:
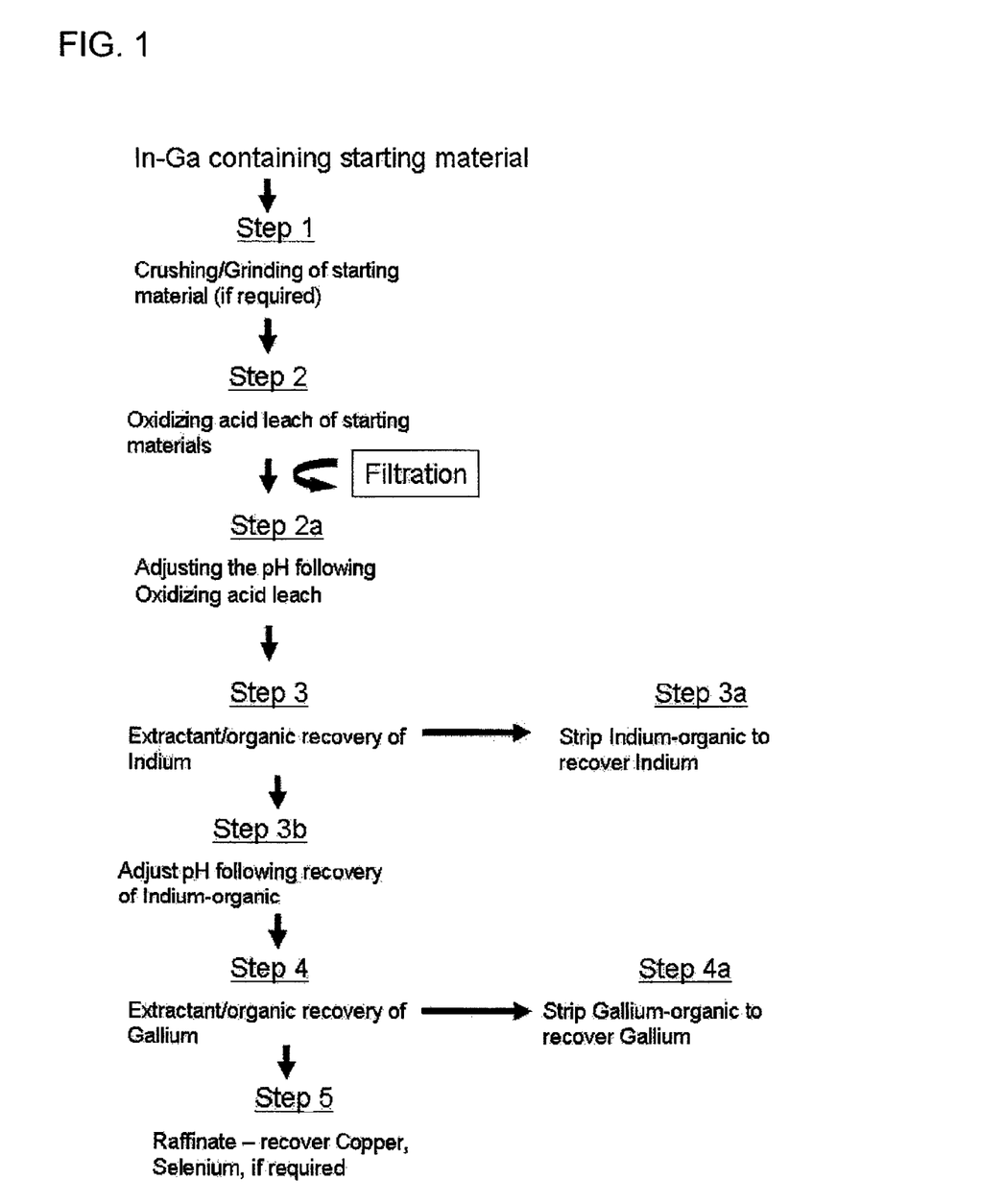
FIG. 1 is a flow diagram of an exemplary process of the disclosure.
Figure 2:
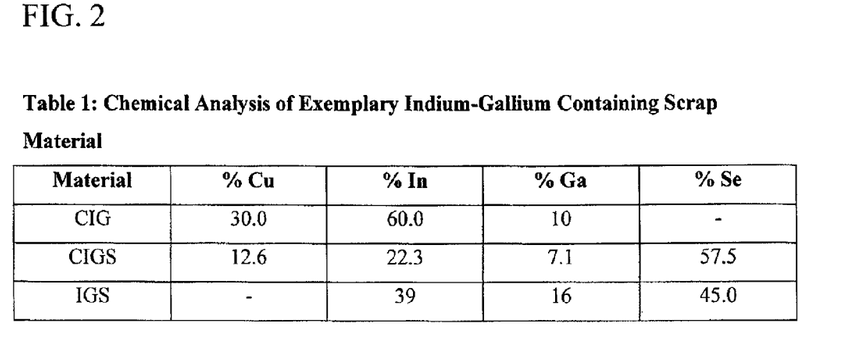
FIG. 2 is a table, Table 1, of the chemical composition of various starting materials.

With reference to FIG. 1, the starting material containing indium and gallium is crushed or ground, if required. In some exemplary embodiments, other metals, such as copper and selenium, may also be present in the starting material. FIG. 2 shows a table, Table 1, having an exemplary approximate chemical analysis of various starting materials (CIG, CIGS and IGS solar panel waste). The starting material may be crushed or ground using conventional techniques. The indium- and gallium-containing material (solar panel waste material, metallurgical residue, ore etc.) is added to an oxidizing acid solution in a leaching step, discussed below, in a finely divided state, for best speed and efficiency of reaction, however, larger pieces of indium- and gallium-containing material may, in some exemplary embodiments, be utilized. The larger pieces of indium- and gallium-containing material may, for example, be from about 1 inch to about 2 inches (about 2.54 cm to about 5.1 cm) in length and have an average cross-sectional dimension of about ½ of an inch (about 1.3 cm).

Although not wishing to be bound, for example and for further clarity and in some embodiments, the finely-divided mixture may have a size expressed in terms of mesh wherein the pieces of the mixture have a mesh of about 100 mesh to about 500 mesh. In other terms, it is preferable that the indium- and gallium-containing material particle size be in the approximate range of about 2 to about 300 microns, and more preferably in about the 20 to about 200 microns range. However it is most desirable to grind or otherwise reduce the indium- and gallium-containing starting material such that the average particle size is less than 100 microns.

Once the indium and gallium starting material is reduced to a desired particle size or finely-divided mixture, in the preferred embodiments, it is dissolved in an acid. In order to aid in the dissolution or solubilization process, is may be desirable to agitate the mixture during the dissolution. It is preferred that an oxidizing acid be used in order to substantially avoid the generation of large amounts of hydrogen gas. For example, although it is possible to utilize the non-oxidizing acids, sulfuric acid ($H_2SO_4$) and hydrochloric acid (HCl), among other non-oxidizing acids, owing to safety concerns, the work area wherein in the process is carried-out would naturally have to be designed to avoid hydrogen explosions. Therefore, in the oxidizing acid leach steps of 2 and 2a (FIGS. 1 and 3, respectively), oxidation of the indium and gallium in the mixture to form an indium salt and a gallium salt, respectively is preferably conducted using an oxidizing acid such as nitric acid ($HNO_3$), Caro's acid (sulfuric acid plus peroxide), chlorine/hydrochloric acid mixtures (with the gaseous chlorine being fed through the liquid and "mopping up" generated hydrogen), sulfuric acid/hypochlorite mixtures, or other acids in admixture with peroxide. Also, in some exemplary embodiments, it may be desirable to agitate the mixture during the oxidizing acid leach step. In an exemplary embodiment, owing to safety concerns and cost, the oxidizing leach step is conducted using sulfuric acid ($H_2SO_4$) and hydrogen peroxide ($H_2O_2$), wherein the hydrogen peroxide is blended into the leach vessel to maintain a minimum redox potential of about 500 mV (Ag/AgCl reference electrode).

It is to be noted that under these strongly oxidizing conditions, of the exemplary embodiment, as discussed above, no significant amount of hydrogen is generated. Moreover, under these same strongly oxidizing conditions, indium and gallium are oxidized to the +3 stage and solubilized as $In_2(SO_4)_3$ and $Ga_2(SO_4)_3$ using the sulfuric acid and hydrogen peroxide embodiment above, thus:

$$2In + 3H_2SO_4 + 3H_2O_2 \rightarrow In_2(SO_4)_3 + 6H_2O \quad \text{Equation 1}$$

$$2Ga + 3H_2SO_4 + 3H_2O_2 \rightarrow Ga_2(SO_4)_3 + 6H_2O \quad \text{Equation 2}$$

At least the following reactions are believed to take place in the acid oxidizing leaching step of the sulfuric acid and hydrogen peroxide embodiment in addition to the reaction noted above with respect to indium and gallium when copper and/or selenium are present:

$$Cu + H_2SO_4 H_2O_2 \rightarrow CuSO_4 + 2H_2O \quad \text{Equation 3}$$

$$Se + 2H_2O_2 \rightarrow H_2SeO_3 + H_2O \quad \text{Equation 4}$$

Figure 3:
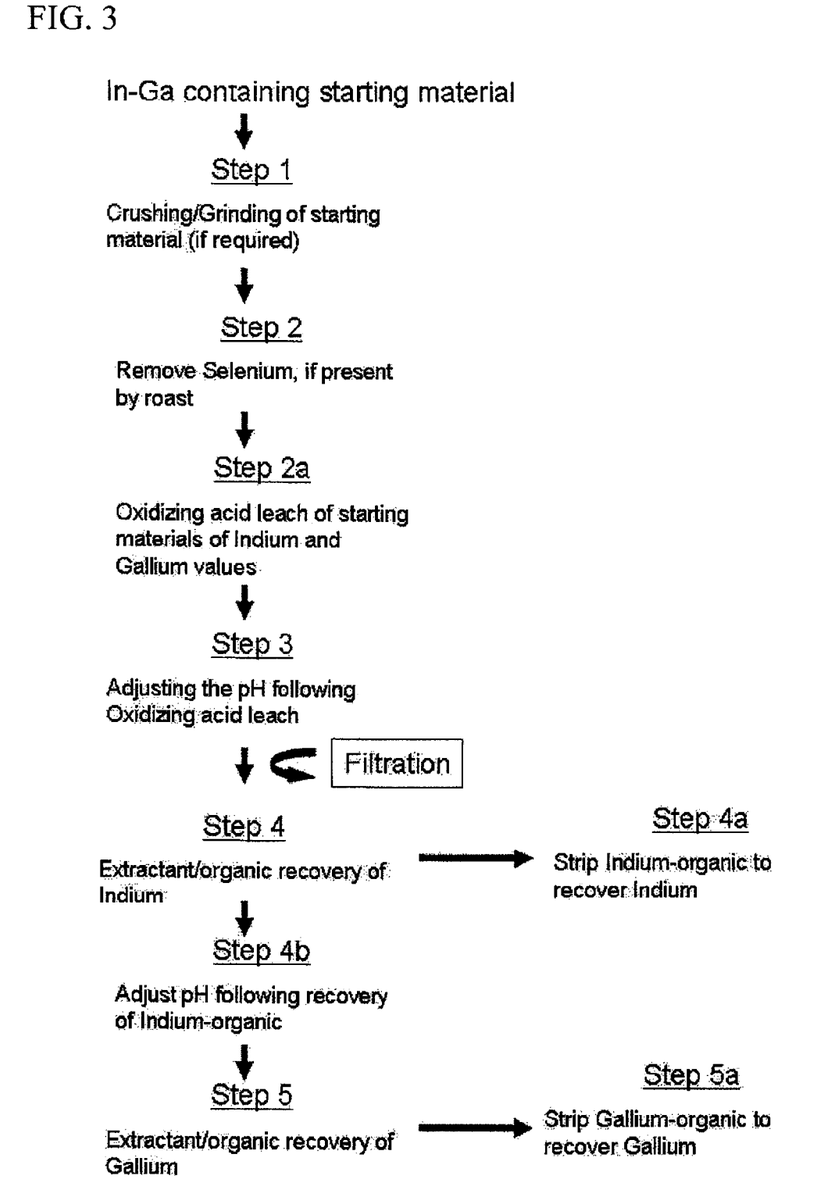
FIG. 3 is a flow diagram of another exemplary process of the disclosure.

Once the indium and gallium-containing starting material is dissolved or solubilized in the acid solution, at from about a pH of 0.5 to about a pH of 0.6, it is filtered so as to substantially remove leach residues or solids and various extractants can be used to extract the various metals from the leaching solution, as shown beginning at steps 3 and 4 of FIGS. 1 and 3, respectively. Furthermore, selenium, which may be present in the starting material, may be solubilized in the acid oxidizing leaching step so as to form $H_2SeO_3$, and similarly, copper which is present in the starting material may be solubilized to form $CuSO_4$. The pH is then adjusted to a range of about 0.5 to about 0.6, as shown respectively in Step 2a and Step 3 of FIGS. 1 and 3. The acidic leaching solution in various embodiments may contain, for example, at this point various salts of indium, gallium, copper and selenium. Diethylhexylphosphoric acid (DEPHA) (Di-2-ethyl-hexyl-phosphoric acid), which is readily commercially available and inexpensive, may be used as convenient extractant. Other suitable extractants may be, for example, tributyl phosphates (TBP) from chloride systems, or carboxylic acids (for example, Versatic 10). However with regard to the choice of suitable chelating extractants the choice of proper pH for extraction is the most critical parameter to control compared to the choice of extractants in order to avoid contamination of the indium value with gallium, and in some embodiments, copper and the contamination of gallium values with copper during the gallium extraction of the desired values. DEPHA is a stable extractant with a high loading capacity for indium and gallium. It is also inexpensive and thus a preferred extractant.

With reference to FIGS. 1 and 3, DEPHA, for example, before being added to the leaching solution containing solubilized indium and gallium values, is prepared to form about a 0.5M to about 1.3M concentration of DEPHA in the organic phase. Under the proper pH conditions, DEPHA compounds only with indium as shown, for example in Equation 5, from the acid leaching solution containing gallium, and in some embodiments copper and/or selenium and/or zinc. Although other conditions may be used, in some exemplary embodiments, the temperature may be maintained from about 10° C. to about 60° C. and the organic extractant may be mixed with the solubilized indium and gallium values for a time period of about 0.5 minutes to about 5 minutes in any suitable contactor such as, for example, a mixer/settler, column, or the like. In order to extract the indium values from the acid leaching solution containing gallium, and in some embodiments copper and/or selenium and/or zinc oxides, the pH value of the acid leaching solution is adjusted within a range of about 0.5 to about 1.0; a first volume of the organic extractant is then added and an indium compound is formed therewith the organic extractant (Equation 5). The pH of the indium compounded with the organic extractant (indium-DEPHA), the indium-loaded organic phase, blended with the gallium salts in the aqueous leaching solution is maintained at a pH from about 0.5 to about 1.0. The indium-loaded organic is then separated, for example, by gravity from the aqueous leaching from the solution as shown, for example, in Separation Scheme 1.

$$In(3+) + 3HA = InA_3 + 3H(+) \quad \text{Equation 5}$$

Where HA represents DEHPA and H represents hydrogen.

Separation Scheme 1

$(InA_3)_{aqueous} \longrightarrow (InA_3)_{organic}$ + remaining aqueous leaching solution

Where $(InA_3)_{aqueous}$ represents the indium-organic compound dispersed in the aqueous phase and $(InA_3)_{organic}$ represents the indium-containing organic phase.

Once substantially all of the indium values have been extracted from the acid leaching solution, the pH is raised to a within a range of about 1.5 to about 2.5, as shown at 3b and 4b of FIGS. 1 and 3 respectively, to enable the formation of the gallium-organic compound on addition of a second volume of the organic extractant.

Similarly to indium, the gallium values will then compound with the second volume of the organic extractant added to the acid leach solution, as shown for example, below according to Equation 6.

$$Ga(3+) + 3HA = GaA_3 + 3H(+) \quad \text{Equation 6}$$

Where HA represents DEHPA and H represents hydrogen.

The gallium values are then extracted from the aqueous acid leaching solution, compounded with the organic extractant (gallium-DEPHA). The gallium-loaded organic, is then separated, for example, by gravity from the aqueous acid leaching solution. (Separation Scheme 2).

Separation Scheme 2

$(GaA_3)_{aqueous} \longrightarrow (GaA_3)_{organic} +$ remaining aqueous leaching solution Where $(GaA_3)_{aqueous}$ represents the gallium-organic compound dispersed in the aqueous phase and $(GaA_3)_{organic}$ represents the gallium-containing organic phase.

It should be noted that other methods of separating the indium-organic and the gallium-organic from the aqueous acid leaching solution may be desirable in some embodiments. However, gravity separation techniques such as atmospheric or centrifugal gravity separation techniques are preferred.

Following the separation of the indium-loaded organic, for example indium-DEPHA, can then be stripped to recover substantially pure indium salt using a suitable acid, according to, for example, the reaction Equation 7, simplified below:

$$(InA_3)_{organic} 3HCl = In(Cl)_3 + 3HA \qquad \text{Equation 7}$$

For example, a concentration of 4N HCl to 8N HCl may be used as a strip solution and a high-purity indium chloride solution may be produced or recovered by conventional means. Preferably, 6N HCl is used as the strip solution. Sulfuric acid, among other acceptable acids may also be used as a strip solution. Conventional techniques or means may include purification, indium cementation with Al or Zn plates, sponge indium alkali melting, anode casting and electrorefining so as to produce >99.995% indium, for example.

The gallium-loaded organic, for example gallium-DEPHA, can also be stripped to yield high purity gallium hydroxide using a suitable alkaline strip solution according to, for example, reaction Equation 8, simplified below:

$$(GaA_3)_{organic} + 3NaOH = Ga(OH)_3 + 3NaA \qquad \text{Equation 8}$$

For example, a concentration of 4N sodium hydroxide to 8N sodium hydroxide may be used as a strip solution and a high-purity gallium hydroxide solution may be produced or recovered by conventional means. For example, preferably, 200 g/L sodium hydroxide (NaOH), about a 5M concentration, may be used as a strip solution and a high-purity gallium value may be produced or recovered by conventional means. Additionally ammonium hydroxide, among other suitable bases, may also be used as strip solution. Conventional techniques or means, may include, for example, direct electrowinning of the gallium hydroxide solution followed by mineral acid cleaning of the metal produced so as to generate >99.99% Ga metal.

In some exemplary embodiments, it may be desirable to recycle the stripped organic, as shown in Equations 7 and 8, for example, such that it can be reused to be further re-loaded with indium and gallium values in future indium and gallium recovery processes. The stripped organic may thus be added to the leaching solution containing solubilized indium and gallium values so as to compound with indium and gallium as shown above in Equations 5 and 6 in subsequent batches for the recovery of indium and gallium values from materials with other metal values. This may be, for example, desirable in a production plant setting.

In some exemplary embodiments, as noted above, it may be desirable to also recover copper and selenium values from the raffinate containing copper and selenium which may, in some exemplary embodiments have been contained in the starting material. Once the indium and gallium values have been recovered as discussed above, conventional processes may be used to precipitate the copper and the selenium so as to generate a liquid effluent which can be safely disposed of in an appropriate facility and/or more compounds which may be recycled to an appropriate industry. For example, conventional techniques or processes which may be used to remove the copper and/or selenium from the raffinate may include, for example, lime precipitation, reductive precipitation, and solvent extraction. In some exemplary embodiments, it may be desirable to further purify the copper and selenium values which may have also been extracted.

In some exemplary embodiments, it may be desirable to remove selenium prior to the separation of the indium and gallium values. With reference to FIG. 3, selenium may, for example be removed from the starting material in Step 1a, prior to the oxidative leaching of the indium and gallium values. In such an embodiment, for example, high temperature oxidative removal of selenium dioxide ($SeO_2$) by roasting in an appropriate furnace may be utilized. The selenium may then be recovered from the gas phase as high grade selenium dioxide which can be sold to an appropriate industry. The roasted product, containing partially oxidized indium and partially oxidized gallium can then be treated according the process as defined above. In some cases, depending on the starting material, copper values may also be present in the roasted product.

In another exemplary embodiment, not shown in the figures, selenium included in a starting material may be removed following the oxidative leaching of indium and gallium values. For example in such an exemplary embodiment, reductive precipitation may be utilized according the generalized reaction in Equations 9 and 10 as follows:

$$H_2SeO_3 + 2SO_2 + H_2O = Se + 2H_2SO_4 \qquad \text{Equation 9}$$

$$H_2SeO_3 + 2H_2SO_4 + 2Na_2S_2O_4 = Se + 4SO_2 + 2Na_2SO_4 + 3H_2O \qquad \text{Equation 10}$$

Following the selenium precipitation, the solution containing oxidized indium and oxidized gallium values can then be treated according the process as defined above in order to extract the indium and gallium values. Additionally, in some cases, depending on the starting material, copper values may also be present in the selenium-devoid product.

Thus the preferred process according to the disclosure comprises the steps of:
providing an oxidizing acid leach solution;
combining the indium- and gallium-containing starting material including other metal values and the oxidizing acid leach solution so as to form a combined solution;
oxidizing and solubilizing the indium and gallium values in the combined solution;
adjusting the pH;
adding a first volume of an organic extractant to the combined solution so as to form indium-loaded organic compounds;
separating the indium-organic phase from the combined solution so as to yield a substantially indium-devoid solution;
adjusting the pH of the indium-devoid solution and adding a second volume of the organic extractant to the indium-devoid solution so as to form a gallium-loaded organic;
separating the gallium-loaded organic from the indium-devoid solution;
stripping the indium-loaded organic compound with an acid so as to recover substantially pure indium salt and yield a first stripped organic extractant; and stripping the gallium-loaded organic compound with a base so as to recover substantially pure gallium salt and yield a second stripped organic extractant.

As noted, the process of the disclosure is applicable not only to recovery of indium and gallium from recycled and scrap solar panel materials, but also to the recovery of indium and gallium from naturally occurring ores.

The disclosure is further described, for illustrative purposes, in the following specific, non-limiting Examples.

Example 1

Samples of various scrap material containing both indium and gallium were crushed and/or ground to a fine powder having an average particle size of less than 100 microns. Each sample was then placed in a vessel and subsequently contacted with an oxidizing acid for a certain time and at a predetermined temperature, as provided in Table 2. At the end of the time periods noted in Table 2, provided as FIG. 4, for the each test, the resulting pulp was filtered, thoroughly washed with water and residue, if any, was dried at 100° C. The filtrate washes and residues were then assayed for the elements of interest, namely indium, gallium, copper and selenium.

Figure 4:
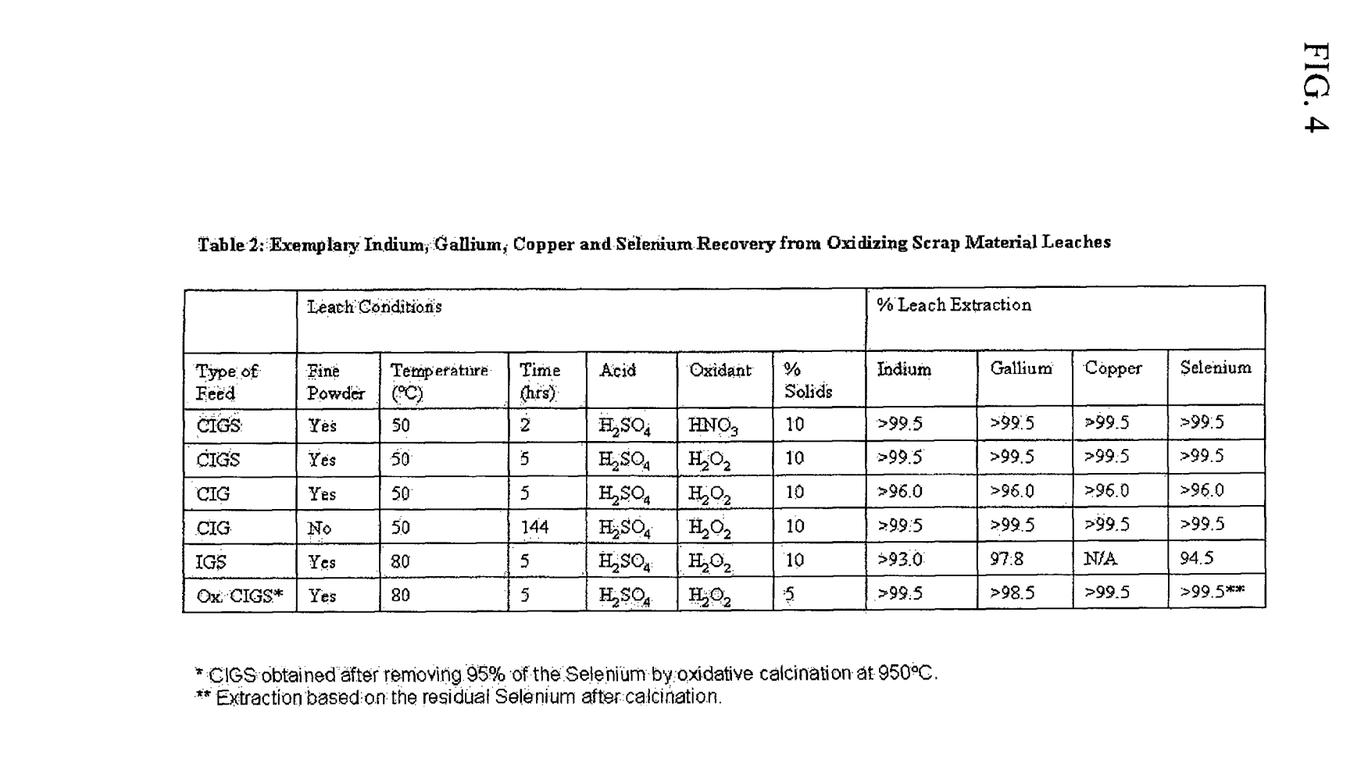
FIG. 4 is a table, Table 2, of the results under various exemplary leaching parameters.

As noted above, Table 2 summarizes the test condition and the results obtained for each of the reaction conditions tested. The results presented in Table 2 indicated that all of the four types of indium and gallium containing scrap material tested could be used to quantitatively leach indium and gallium, and, if present, copper and selenium. Also, owing to the oxidizing conditions of the reactions, redox potential measured during the leaching process was always greater than 500 mV as measured using an Ag/AgCl reference electrode. In some exemplary embodiments, not shown, the feed may be ground and crushed so as to have an average particle size of the less than 100 microns. The reaction kinetics, it is expected, would be further improved with finer sizes and increased temperatures of the leaching reactions. As such, smaller average particle sizes of the feeds and higher reaction temperature are considered to be within the scope of the current disclosure.

Example 2

Figure 5:
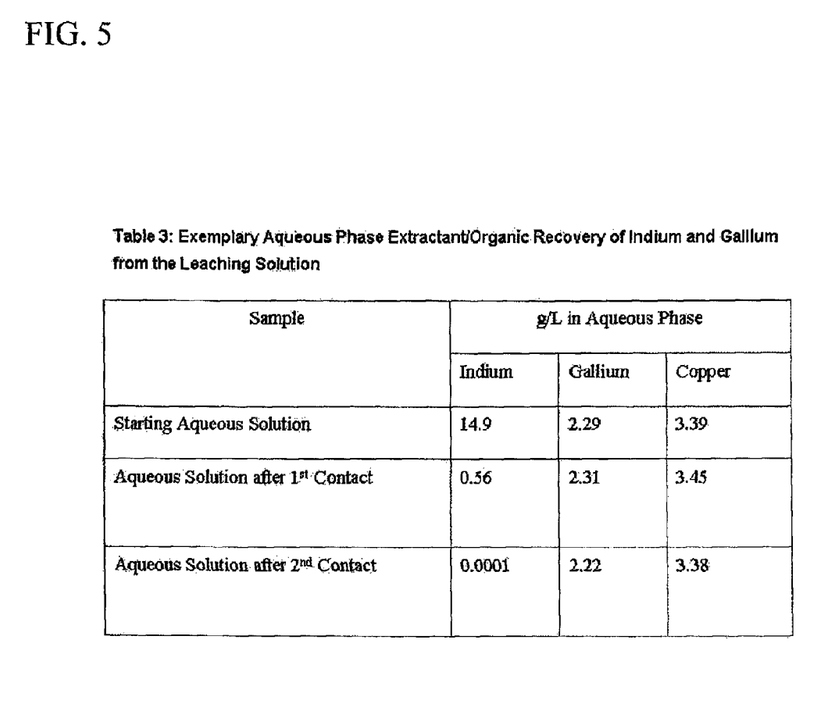
FIG. 5 is a table, Table 3, of the results of an exemplary embodiment of an extractant/organic recovery of indium and gallium from the leaching solution.

A leaching solution generated by oxidizing acid leaching a sample of CIG, as per conditions similar to those presented in Example 1, above, was assayed after dilution with water such that the starting solution contained about: 14.9 g/L In, 2.29 g/L Ga and 3.39 g/L Cu. After adjusting the pH of the above-mentioned solution to 0.56 (using caustic soda, NaOH), the leaching solution was contacted with and organic solution comprising 30% DEPHA (0.9M), 10% isodecanol as a phase modifier and 60% of an aliphatic diluent (kerosene-type, for example Escaid or Isopar 100). The volume ratio of the aqueous phase (A-aqueous leach solution) and the organic phase (O) was kept at 1(O/A=1/1), the pH adjusted to 0.5, and the two solutions were mixed and agitated over a time period of about 10 minutes. Following the agitation, the two resultant phases were separated by gravity separation and the aqueous phase was subjected to a second contact with the organic solution noted above under the same conditions (O/A=1/1 and pH=0.5) using fresh organic solution. The aqueous phases after each contact were submitted to analysis and the results are presented in Table 3 of FIG. 5. Briefly, with reference to Table 3, the conditions tested allow for the selective separation of the indium from the gallium and copper values wherein a major portion of the indium present in the starting aqueous phase has been removed after the first and second contacts, while, roughly equal amounts of copper and gallium are present in the starting aqueous phase, the aqueous phase after the first contact and the aqueous phase after the second contact and therefore were not removed by the organic.

Example 3

Figure 6:
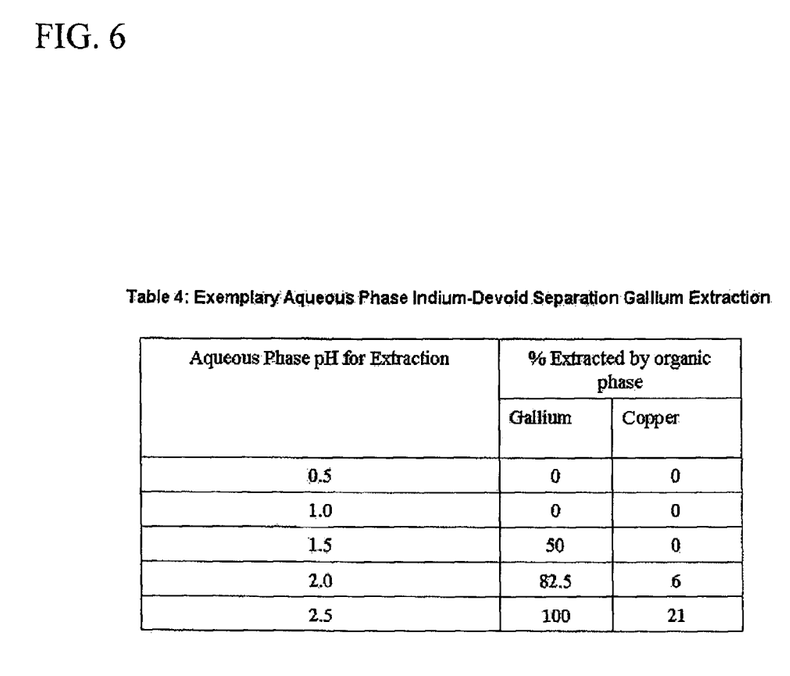
FIG. 6 is a table, Table 4, of the results of an exemplary embodiment of aqueous phase indium-devoid separation gallium extraction.

Experiments were conducted to determined the pH at which gallium would be selectively extractable from the copper remaining in solution following the selective extraction of a major portion of the indium values. The pH of an indium solvent raffinate was adjusted to various values, using NaOH and the resulting solution, the aqueous phase, was contacted with a 30% DEPHA (0.9M) so as to produce an organic phase to aqueous phase mixture in contact for 10 minutes. The extraction of gallium was calculated by assaying the aqueous phases for each of the pH experiments. The results are presented in Table 4 of FIG. 6. With reference to Table 4, it is shown that gallium can be extracted from the substantially indium-devoid aqueous raffinate noted above once the pH is maintained at 1.5 or above, while copper is only marginally extracted, even at pH=2.0.

Example 4

A leach solution, the aqueous phase, generated by oxidizing acid leaching a sample of CIGS material using conditions similar to those presented in Example 1 was assayed an analyzed, after dilution with water such that the starting solution contained about: 8.78 g/L In, 2.85 g/L Ga, 5.86 g/L Cu and 23.5 g/L Se. After adjusting the pH to 1.0 the indium was substantially selectively extracted using a 30% DEPHA (0.9M), the organic phase, in a ratio of about 2 to 1 organic to aqueous phase, by volume, followed by substantial extraction of the gallium values at a pH of 1.7 using 30% DEPHA in a ratio of about 2 to 1 organic to aqueous phase, by volume, in a procedure similar to that of Example 2, above. The results of this extraction procedure are displayed in Table 5 of FIG. 7.

Figure 7:
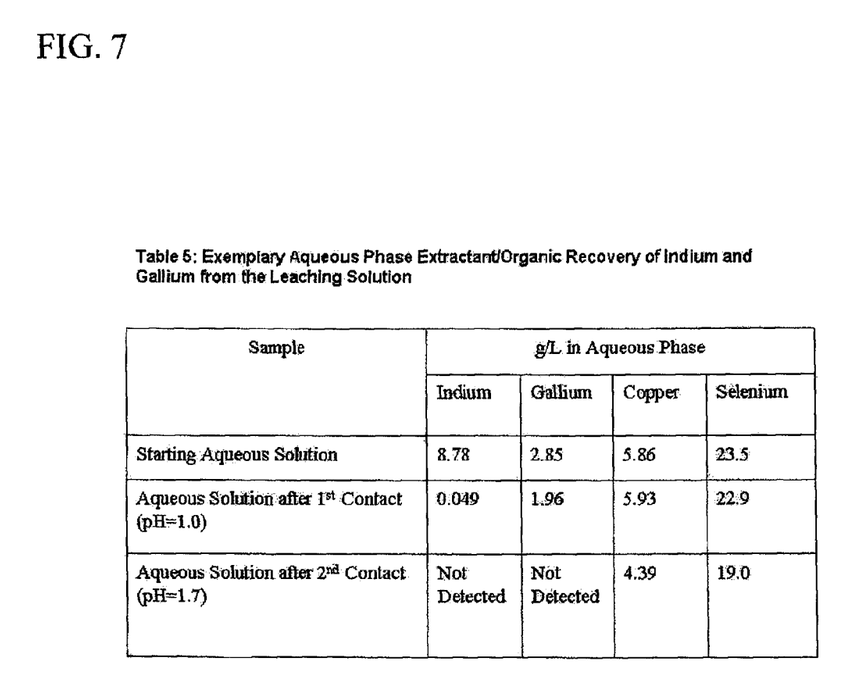
FIG. 7 is a table, Table 5, of the results of an exemplary embodiment of an extractant/organic recovery of indium and gallium with other metal values from the leaching solution.

The results, as shown in Table 5, indicate that the process is effective, even in the presence of large quantities of selenium (23.5 g/L) for the extraction of indium and gallium values from the starting aqueous leaching solution. Substantially all of the indium can be first selectively extracted from the starting aqueous solution, leaving roughly equal amounts of gallium, copper and selenium in the aqueous solution. Following the $1^{st}$ contact with the organic solution, a large portion of the gallium values can be extracted, again leaving roughly equal amounts of copper and selenium in the aqueous solution after the $2^{nd}$ contact with the organic solution wherein indium- and gallium-values are not detectable.

Briefly, with reference to Table 5, the conditions tested allow for the selective separation of the indium, gallium, copper and selenium values wherein a major portion of the indium present in the starting aqueous phase is removed after one organic contact, while basically no gallium is removed in that stage but only after increasing the pH to 1.7 and contacting with the organic again; roughly equal amounts of copper and selenium are present in the starting aqueous phase, the aqueous phase after the first contact and the aqueous phase after the second contact, indicating that copper and selenium are not extracted by the organic phases under the conditions used.

Those of skill in the art will recognize certain modifications, permutations, and additions to the process noted herein. While the process has been described for what are presently considered the exemplary embodiments, the disclosure is not so limited. To the contrary, the disclosure is intended to cover various modifications, equivalent steps and substitutions included within the spirit and scope of the appended claims.

What is claimed is:

1. A hydrometallurgical process of recovering indium and gallium values from metallurgical residue material with other metal values, the process comprising the steps of:
   a) reducing the size of the indium- and gallium-containing materials so as to form a finely-divided mixture including indium and gallium values with other metals;
   b) subjecting the mixture to strongly oxidizing aqueous acid conditions provided by Caro's acid, chlorine/hydrochloric acid mixtures, sulphuric acid/hypochlorite mixtures or sulphuric acid/hydrogen peroxide mixtures, such that the generation of hydrogen gas is substantially avoided, so as to form indium salt and gallium salt species in an aqueous leaching solution of at least a major portion by weight of the indium and gallium values from the mixture;
   c) filtering the aqueous leaching solution so as to substantially remove leach residues and maintaining the pH of the leaching solution during a leaching process, at from about 0.5 to about 1.0;
   d) subjecting the indium and gallium salt species in the aqueous leaching solution, within the aforesaid pH range of about 0.5 to about 1.0, to a first volume of an organic extractant so as to selectively form an indium-organic in an organic phase;
   e) separating and recovering at least a major portion of the indium-organic resultant from (d) from the gallium salt species in the aqueous leaching solution;
   f) adjusting and maintaining the pH of the aqueous leaching solution resultant from (e) after the leaching process at from about 1.5 to 2.5 so as to enable subsequent recovery of gallium-organic;
   g) subjecting the gallium salt species in the aqueous leaching solution to a second volume of the organic extractant so as to selectively form a gallium-organic in the organic phase;
   h) separating the gallium-organic resultant from (g) so as to recover at least a major portion of the gallium-organic;
   i) stripping the recovered indium-organic with an acid so as to yield a substantially pure indium salt and a first stripped organic extractant; and
   j) stripping the recovered gallium-organic with a base so as to yield a substantially pure gallium salt and a second stripped organic extractant.

2. The process as defined in claim 1, wherein the metallurgical residue material contains selenium, the selenium being solubilized in (b) so as to form $H_2SeO_3$.

3. The process as defined in claim 1, wherein the metallurgical material is scrap or recycled solar panel material having mixed values selected from the group consisting of copper-indium-gallium-selenium, indium-gallium-selenium, gallium-indium-zinc oxide, and copper-indium-gallium.

4. The process as defined in claim 1, wherein the first and second volumes of the organic extractant in (d) and (g) respectively comprise from about a 0.5M to about 1.3M concentration of DEHPA.

5. The process as defined in claim 1, wherein the stripping acid in (i) so as to yield the substantially pure indium salt is hydrochloric acid and the stripping base in (j) so as to yield the substantially pure gallium salt is sodium hydroxide.

6. The process as defined in claim 5, wherein the hydrochloric acid is provided at a concentration of from about 4N to about a concentration of 8N and the sodium hydroxide is provided at a concentration of from about 4N to about a concentration of 8N.

7. The process as defined in claim 5, wherein the hydrochloric acid is provided at about a 6N concentration and the sodium hydroxide is provided at about a 5M concentration.

8. The process as defined in claim 1, wherein the finely-divided mixture of indium and gallium values with other metal values has a particle size within the approximate range of 20 microns to 200 microns.

9. The process as defined in claim 1, wherein the finely-divided mixture of indium and gallium values with other metal values is provided as pieces having a length of from about 2.54 cm to about 5.1 cm and an average cross-sectional dimension of about 1.3 cm.

10. The process as defined in claim 1, wherein the finely-divided mixture of indium and gallium values with other metal values has a particle size range of from about 100 mesh to about 500 mesh.

11. The process as defined in claim 1, wherein (i) further comprises recycling the first stripped organic extractant and combining the first stripped organic extractant with the first volume of an organic extractant in (d).

12. The process as defined in claim 1, wherein (j) further comprises recycling the second stripped organic extractant and combining the second stripped organic extractant with the second volume of an organic extractant in (g).

* * * * *

UNITED STATES PATENT AND TRADEMARK OFFICE
CERTIFICATE OF CORRECTION

PATENT NO. : 8,834,818 B2  
APPLICATION NO. : 13/989740  
DATED : September 16, 2014  
INVENTOR(S) : Cesare G. Ferron Page 1 of 1

It is certified that error appears in the above-identified patent and that said Letters Patent is hereby corrected as shown below:

On the patent title page, under Item (75) Inventor, the Inventor's name should read as follows:
--Cesare G. Ferron--

On title page 2, in the first column, the cited reference should read as follows:
--Nishihama et al., "Separation and Recovery of Gallium and Indium from Simulated Zinc Refinery Residue by Liquid-Liquid," Ind. Chem. Res. 38(3): 1032-1039 (1999).--

IN THE SPECIFICATION:

In Column 7, line 45 should read as follows:
--$Cu + H_2SO_4 + H_2O_2 \rightarrow CuSO_4 + 2H_2O$       Equation 3--

In Column 9, line 25 should read as follows:
--$(InA_3)_{organic} + 3HCl = In(Cl)_3 + 3HA$       Equation 7--

Signed and Sealed this  
Twenty-fourth Day of February, 2015

Michelle K. Lee  
*Deputy Director of the United States Patent and Trademark Office*